United States Patent
Sarai et al.

(10) Patent No.: US 9,561,720 B2
(45) Date of Patent: Feb. 7, 2017

(54) DRIVING FORCE DISTRIBUTION CONTROL APPARATUS

(71) Applicants: JTEKT Corporation, Osaka-shi (JP); Mazda Motor Corporation, Aki-gun (JP)

(72) Inventors: Kotaro Sarai, Nishio (JP); Tomoaki Kato, Kariya (JP); Hiroto Kawano, Hiroshima (JP); Daisuke Kofu, Hiroshima (JP); Yasushi Yagi, Hiroshima (JP)

(73) Assignees: JTEKT CORPORATION, Osaka-shi (JP); MAZDA MOTOR CORPORATION, Aki-gun (JP)

( * ) Notice: Subject to any disclaimer, the term of this patent is extended or adjusted under 35 U.S.C. 154(b) by 15 days.

(21) Appl. No.: 14/637,705

(22) Filed: Mar. 4, 2015

(65) Prior Publication Data

US 2015/0258889 A1 Sep. 17, 2015

(30) Foreign Application Priority Data

Mar. 12, 2014 (JP) .................................. 2014-048729

(51) Int. Cl.
| | |
|---|---|
| *G06F 7/00* | (2006.01) |
| *G06F 17/00* | (2006.01) |
| *G06F 19/00* | (2011.01) |
| *B60K 23/08* | (2006.01) |
| *B60K 17/35* | (2006.01) |

(52) U.S. Cl.
CPC .......... *B60K 23/0808* (2013.01); *B60K 17/35* (2013.01); *B60K 2023/0833* (2013.01); *B60K 2023/0858* (2013.01)

(58) Field of Classification Search
CPC .................................................. B60W 2530/20
See application file for complete search history.

(56) References Cited

U.S. PATENT DOCUMENTS

| | | | | |
|---|---|---|---|---|
| 5,246,278 A | * | 9/1993 | Yoshino | ................ B60T 8/1706 303/163 |
| 5,461,568 A | * | 10/1995 | Morita | ............... B60K 23/0808 180/197 |

(Continued)

FOREIGN PATENT DOCUMENTS

JP 2004-90703 3/2004

*Primary Examiner* — Tisha Lewis
(74) *Attorney, Agent, or Firm* — Oblon, McClelland, Maier & Neustadt, L.L.P.

(57) ABSTRACT

A driving force distribution control apparatus includes: a driving force transmission device including a clutch which can change distribution of a driving force to front wheels and rear wheels of a four-wheel drive vehicle; and a controller which controls an engagement force of the clutch in accordance with a traveling state. The controller includes a different-diameter tire detector which detects an attachment of a different-diameter tire to one of the front wheels and the rear wheels when a rotation speed ratio between the front wheels and the rear wheels continues to be equal to or larger than a reference rotation speed ratio for a predetermined time. The different-diameter tire detector performs detection of the attachment of the different-diameter tire when it is determined that the wheels are unlikely to slip based on an outside condition.

4 Claims, 3 Drawing Sheets (56) References Cited

U.S. PATENT DOCUMENTS

| | | | | |
|---|---|---|---|---|
| 5,748,474 A * | 5/1998 | Masuda | ............ | B60K 23/04 |
| | | | | 180/197 |
| 6,497,301 B2 * | 12/2002 | Iida | ............ | B60K 17/3505 |
| | | | | 180/249 |
| 2002/0002433 A1 * | 1/2002 | Matsuno | ............ | B60K 23/04 |
| | | | | 701/67 |
| 2002/0007242 A1 * | 1/2002 | Tanaka | ............ | B60K 17/348 |
| | | | | 701/69 |
| 2004/0059494 A1 * | 3/2004 | Yoneda | ............ | B60K 23/0808 |
| | | | | 701/89 |

* cited by examiner

DRIVING FORCE DISTRIBUTION CONTROL APPARATUS

CROSS-REFERENCE TO RELATED APPLICATION

This application is based on and claims the benefit of priority from Japanese Patent Application No. 2014-048729 filed on Mar. 12, 2014, the entire contents of which are incorporated herein by reference.

BACKGROUND

1. Technical Field

One or more embodiments of the present invention relate to a driving force distribution control apparatus for a four-wheel drive vehicle.

2. Description of Related Art

In the background art, there is known a driving force distribution control apparatus provided with a clutch which can change distribution of a driving force to front wheels and rear wheels, and a controller which controls an engagement force of the clutch in accordance with a traveling state (for example, see Patent Document 1).

In the driving force distribution control apparatus disclosed in Patent Document 1, pre-torque T1 corresponding to a quantity of accelerator operation performed by a driver and ΔN torque T2 corresponding to a differential rotation frequency between the front wheels and the rear wheels are calculated, and a driving force is transmitted to the rear wheels (driven wheel side) through the clutch based on command torque T which is a summation of the pre-torque T1 and the ΔN torque T2.

The driving force distribution control apparatus also includes a different-diameter tire attachment determination unit which determines whether a different-diameter tire has been attached or not based on a difference in wheel speed between the front wheels and the rear wheels in a steady traveling state. When it is determined that a different-diameter tire has been attached, the clutch is controlled to prevent a driving force corresponding to the pre-torque T1 from being transmitted to the rear wheels. Thus, suppressed is a bad influence which may occur due to the clutch engaged in the state where the different-diameter tire has been attached.

Patent Document 1: JP-A-2004-90703

SUMMARY

In the case where a different-diameter tire is not attached, a difference in wheel speed between front wheels and rear wheels may increase due to a slip during traveling on a low-μ road. During traveling on a low-μ road, a slip may occur more easily in the front wheels than in the rear wheels, for example, in the state where a larger driving force is distributed to the front wheels than to the rear wheels. Since the rotation speed in the front wheels is higher than the rotation speed in the rear wheels, there may occur a difference in wheel speed in the same manner as in the case where a different-diameter tire whose diameter is smaller than the diameter of a tire attached to each rear wheel is attached to a front wheel or in the case where a different-diameter tire whose diameter is larger than the diameter of a tire attached to each front wheel is attached to a rear wheel. That is, when a different-diameter tire or different-diameter tires are attached to one or both of left and right wheels of front wheels or rear wheels, there may occur a similar difference in wheel speed to the difference in wheel speed occurring when a slip occurs.

In the driving force distribution control apparatus disclosed in Patent Document 1, in order to enhance the accuracy in detecting attachment of a different-diameter tire in the above-described situation, the attachment of a different-diameter tire is determined only when the difference in wheel speed between front wheels and rear wheels reaches at least a predetermined valve continuously for at least a predetermined time (10 seconds). However, for example, when a vehicle is traveling on a pressed snow uphill road or the like and a short value is used as the predetermined time, the state in which the difference in wheel speed between front wheels and rear wheels is larger than the predetermined value may continue beyond the predetermined time. In such a situation, it is difficult to secure the accuracy in detecting the attachment of a different-diameter tire.

As a solution to this problem, it can be considered to elongate the above-described predetermined time. In that case, however, detection time (time required for detection) between the time when traveling is started in the state where the different-diameter tire has been attached and the time when the attachment of the different-diameter tire is detected in the controller is elongated undesirably.

It is therefore an object of one or more embodiments of the invention to provide a driving force distribution control apparatus capable of securing accuracy in detecting a different-diameter tire without elongating detection time.

One or more embodiments of the present invention provide a driving force distribution control apparatus including: a driving force transmission device including a clutch which can change distribution of a driving force to front wheels and rear wheels of a four-wheel drive vehicle; and a controller which controls an engagement force of the clutch in accordance with a traveling state, wherein the controller includes a different-diameter tire detector which detects an attachment of a different-diameter tire to one of the front wheels and the rear wheels when a rotation speed ratio between the front wheels and the rear wheels continues to be equal to or larger than a reference rotation speed ratio for a predetermined time, and wherein the different-diameter tire detector performs detection of the attachment of the different-diameter tire when it is determined that the wheels are unlikely to slip based on an outside condition.

According to one or more embodiments of the present invention, it is possible to secure accuracy in detecting a different-diameter tire without elongating detection time.

DETAILED DESCRIPTION

Figure 1:
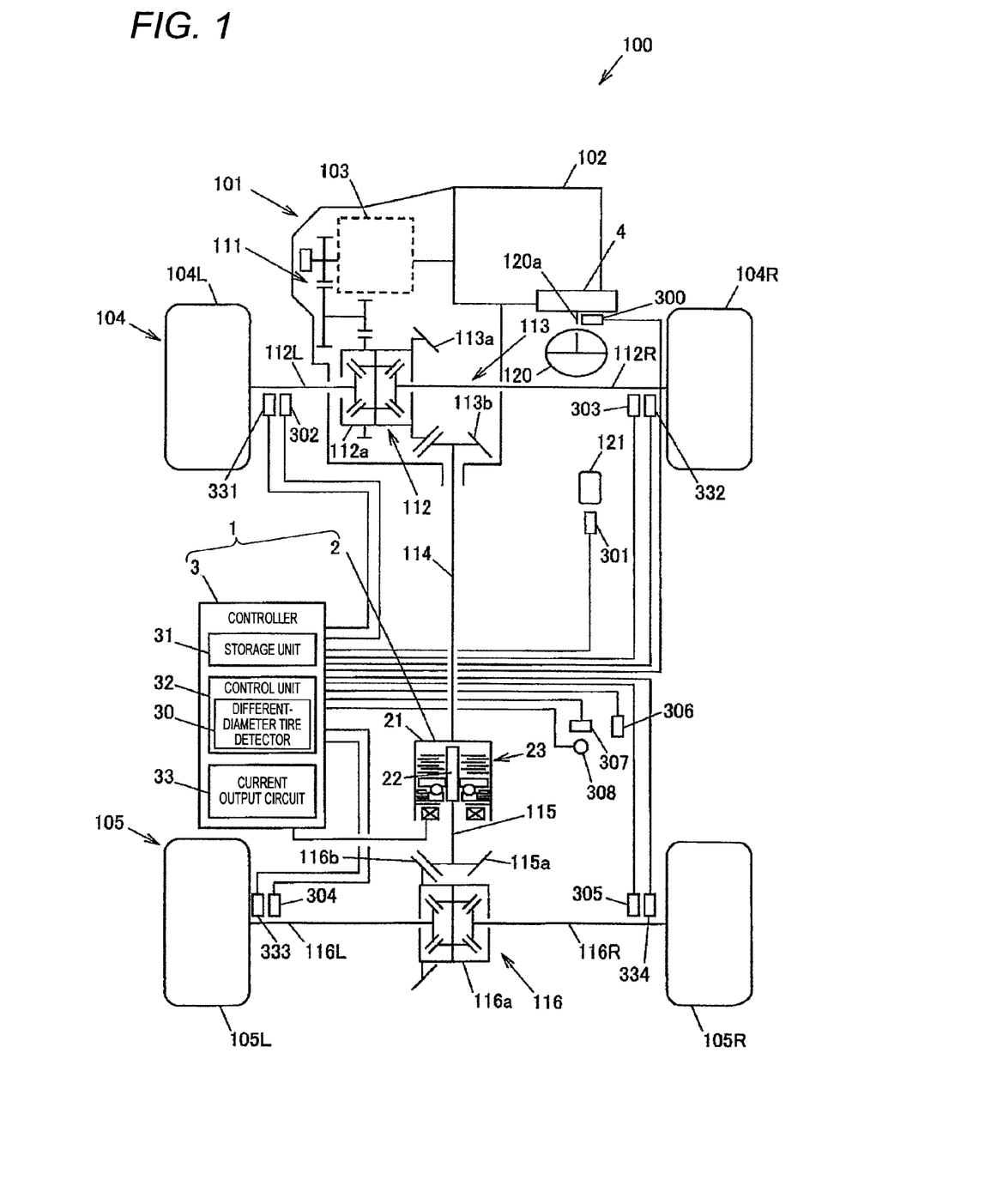
FIG. 1 is a schematic diagram showing a configuration example of a four-wheel drive vehicle according to an embodiment of the invention.

FIG. 1 is a schematic diagram showing a configuration example of a four-wheel drive vehicle according to an embodiment of the invention. This four-wheel drive vehicle 100 is mounted with an engine 102 which serves as a driving source, a transmission 103 which changes an output of the engine 102 and outputs the changed output as a driving force, a driving force transmission system 101 which transmits the driving force outputted from the transmission 103 to four wheels so that the drive state of the vehicle can be switched between a two-wheel drive state and a four-wheel drive state, a controller 3, and a steering device 4 which steers front wheels 104. In the two-wheel drive state, the driving force is transmitted to only the front wheels 104 (a left front wheel 104L and a right front wheel 104R) of the four wheels. In the four-wheel drive state, the driving force is transmitted to the front wheels 104 (the left front wheel 104L and the right front wheel 104R) and rear wheels 105 (a left rear wheel 105L and a right rear wheel 105R). In addition, a steering wheel 120 and an accelerator pedal 121 on which a driver can operate are disposed in a cabin of the four-wheel drive vehicle 100.

The engine 102 is an internal combustion engine to which fuel is supplied in accordance with the stepping quantity of the accelerator pedal 121. Incidentally, an electric motor may be used as a driving source for the four-wheel drive vehicle 100 in place of the engine 102. Further, an engine and an electric motor may be used as driving sources for the four-wheel drive vehicle 100.

The steering device 4 steers the left front wheel 104L and the right front wheel 104R in accordance with the rotating operation performed on the steering wheel 120 by the driver. Various types of steering devices including a rack and pinion type, a ball screw type, a gear ratio variable type, etc. may be applied to the steering device 4.

Configuration of Driving Force Transmission System 101

The driving force transmission system 101 has a front differential device 112 which distributes torque to the left front wheel 104L and the right front wheel 104R, a gear mechanism 111 which transmits the output torque of the transmission 103 to a differential case 112a of the front differential device 112, a transfer 113 which includes an input gear 113a linked with the differential case 112a and an output gear 113b whose rotating shaft is made perpendicular to the rotating shaft of the input gear 113a so that the output gear 113b can mesh with the input gear 113a, a propeller shaft 114 which is linked with the output gear 113b, the driving force transmission device 2, a pinion gear shaft 115 to which the torque of the propeller shaft 114 is transmitted through the driving force transmission device 2, and a rear differential device 116 which distributes, to the left rear wheel 105L and the right rear wheel 105R, the torque transmitted to the pinion gear shaft 115.

The driving force transmission system 101 also has drive shafts 112L and 112R which are linked with a pair of side gears of the front differential device 112 respectively, and drive shafts 116L and 116R which are linked with a pair of side gears of the rear differential device 116 respectively. The drive shafts 112L and 112R transmit torque to the left front wheel 104L and the right front wheel 104R respectively, and the drive shafts 116L and 116R transmit torque to the left front wheel 105L and the right front wheel 105R respectively.

A ring gear 116b is provided in the outer peripheral portion of the differential case 116a of the rear differential device 116 so that the ring gear 116b cannot rotate relatively thereto. The ring gear 116b is engaged with a drive pinion 115a of the pinion gear shaft 115 so as to transmit torque from the pinion gear shaft 115 to the differential case 116a.

Due to the above-described configuration of the driving force transmission system 101, the torque outputted from the transmission 103 is always transmitted to the left front wheel 104L and the right front wheel 104R. On the other hand, the torque is transmitted to the left rear wheel 105L and the right rear wheel 105R, if necessary, in accordance with the traveling state of the four-wheel drive vehicle 100 due to the operation of the driving force transmission device 2. That is, in the four-wheel drive vehicle 100 according to the embodiment, the left front wheel 104L and the right front wheel 104R serve as main driving wheels while the left rear wheel 105L and the right rear wheel 105R serve as auxiliary driving wheels.

The driving force transmission device 2 has a clutch housing 21 which rotates together with the propeller shaft 114 so that the clutch housing 21 can adjust the torque transmitted from the propeller shaft 114 to the rear differential device 116 through the pinion gear shaft 115, an inner shaft 22 which rotates together with the drive pinion 115a coaxially with the clutch housing 21, and a multiple plate clutch 23 which is disposed between the clutch housing 21 and the inner shaft 22. The configuration of the driving force transmission device 2 will be described in detail later.

Configuration of Controller 3

The controller 3 has a storage unit 31 which consists of a memory device such as a ROM or a RAM, a control unit 32 which consists of an arithmetic processing unit such as a CPU, and a current output circuit 33 which is controlled by the control unit 32. In the controller 3, the control unit 32 operates based on a program stored in the storage unit 31 so as to perform arithmetic operation to obtain a value of command torque to be transmitted to the rear wheels 105, based on a differential rotation frequency between the front wheels 104 and the rear wheels 105 of the four-wheel drive vehicle 100, a quantity of accelerator operation performed by the driver, etc.

The current output circuit 33 supplies a current to the driving force transmission device 2 in accordance with the command torque obtained by the arithmetic operation of the control unit 32. The current output circuit 33 is an inverter circuit by which a current supplied, for example, from a not-shown battery can be outputted with a current amount adjusted by PWM (Pulse Width Modulation) control.

Detection signals are inputted to the controller 3 from a steering angle sensor 300 for detecting a steering angle of a steering shaft 120a linked with the steering wheel 120 and an accelerator opening sensor 301 for detecting an accelerator opening (accelerator operation quantity) corresponding to the stepping quantity of the accelerator pedal 121. Detections signals of wheel speed sensors 302 to 305 are also inputted to the controller 3. The wheel speed sensors 302 to 305 are provided correspondingly to the left front wheel 104L, the right front wheel 104R, the left rear wheel 105L and the right rear wheel 105R respectively so as to detect the rotation speeds of the wheels respectively.

Further, detection signals of a longitudinal acceleration sensor 306, a lateral acceleration sensor 307, a yaw rate sensor 308 and load sensors 331 to 334 are also inputted to the controller 3. The longitudinal acceleration sensor 306 detects the longitudinal acceleration of the four-wheel drive vehicle 100. The lateral acceleration sensor 307 detects the lateral (vehicle width direction) acceleration. The yaw rate sensor 308 detects the yaw rate. The load sensors 331 to 334 detects loads on the left and right front wheels 104L and 104R and the left and right rear wheels 105L and 105R respectively.

The detection signals of the sensors 300 to 308 and 331 to 334 may be inputted directly to the controller 3 via signal lines connected to the sensor bodies or may be inputted to the controller 3 by communication through a vehicle-mounted network such as a CAN (Controller Area Network).

Configuration of Driving Force Distribution Apparatus 1

The driving force transmission device 2 and the controller 3 constitutes a driving force distribution control apparatus 1 which can change the distribution of the driving force to the front wheels 104 and the rear wheels 105 in accordance with the traveling state. The controller 3 controls the engagement force of the multiple plate clutch 23 of the driving force transmission device 2 in accordance with the traveling state. When the engagement force of the multiple plate clutch 23 is high, the distribution proportions of the driving force to the front wheels 104 and the rear wheels 105 are equalized. When the engagement force of the multiple plate clutch 23 is low, the distribution proportion of the driving force to the rear wheels 105 becomes low while the distribution proportion of the driving force to the front wheels 104 becomes high. The multiple plate clutch 23 serves as an example of a "clutch" according to embodiments of the invention, which can change the distribution of the driving force to the front wheels and the rear wheels.

In addition, the control unit 32 of the controller 3 operates based on a program stored in the storage unit 31 and thereby serves as a different-diameter tire detector 30 for detecting that a different-diameter tire has been attached to one of the front wheels 104 or one of the rear wheels 105. The control unit 32 serving as the different-diameter tire detector 30 detects the attachment of a different-diameter tire based on a difference in wheel speed between the front wheels 104 and the rear wheels 105. That is, the controller 3 includes the different-diameter detector 30 for detecting the attachment of a different-diameter tire to the front wheel 104 or the rear wheel 105 based on the difference in wheel speed between the front wheels 104 and the rear wheels 105.

Here, the different-diameter tire means a tire which is, for example, a spare tire having a different tire diameter from the tire diameter of an original tire that should be attached. The diameter of a tire loaded on a vehicle as a spare tire is generally smaller than the diameter of an original tire by about 6% to 10%. When such a different-diameter tire is attached, the different-diameter tire rotates at a higher speed than any other tire in spite of a straight and steady traveling state of the four-wheel drive vehicle 100 (in the state where the four-wheel drive vehicle 100 is traveling straight at a substantially constant vehicle speed) in which the rotation speed of the front wheels 104 should be equalized with that of the rear wheels 105. As a result, differential rotation occurs between the front wheels 104 and the rear wheels 105.

For example, when a different-diameter tire whose diameter is smaller than that of a tire attached to any other wheel is attached to the right front wheel 104R, the right front wheel 104R rotates faster than any other wheel of the left front wheel 104L and the left and right rear wheels 105L and 105R in the straight and steady traveling state. As a result, the average rotation speed of the front wheels 104 becomes higher than the average rotation speed of the rear wheels 105 so that differential rotation occurs between the front and rear wheels. On the contrary, when a different-diameter tire whose diameter is larger than that of a tire attached to any other wheel is attached to the right front wheel 104R, the right front wheel 104R rotates slower than any other wheel of the left front wheel 104L and the left and right rear wheels 105L and 105R in the straight and steady traveling state. As a result, the average rotation speed of the front wheels 104 becomes lower than the average rotation speed of the rear wheels 105 so that differential rotation occurs again between the front and rear wheels.

When the multiple plate clutch 23 of the driving force transmission device 2 is engaged in such a state, there is a fear that clutch plates (outer clutch plates 231 and inner clutch plates 232 which will be described later) of the multiple plate clutch 23 always frictionally slide on each other, resulting in excessive abrasion or excessive heat generation. Therefore, when the control unit 30 of the controller 3 serving as the different-diameter tire detector 30 detects the attachment of a different-diameter tire, the control unit 32 reduces the engagement force of the multiple plate clutch 23 in comparison with that in normal time (when no different-diameter tire is attached). The contents of processing to be executed by the control unit 32 will be described in detail later.

Configuration of Driving Force Transmission Device 2

Figure 2:
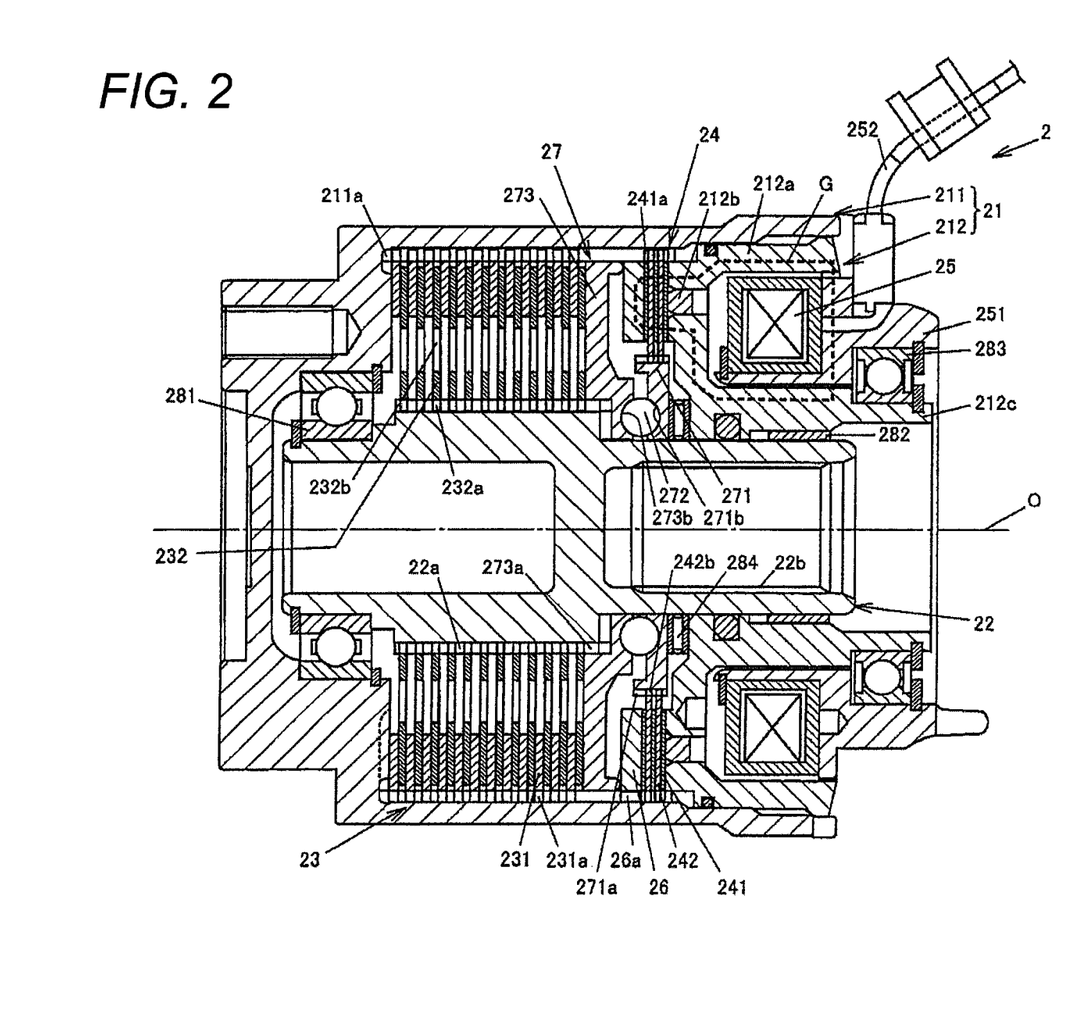
FIG. 2 is a sectional view showing a configuration example of a driving force transmission device.

FIG. 2 is a sectional view showing a configuration example of the driving force transmission device 2. The driving force transmission device 2 is roughly constituted by the clutch housing 21 which is linked with the propeller shaft 114, the inner shaft 22 which is supported rotatably relatively to the clutch housing 21, the multiple plate clutch 23 which is disposed between the inner peripheral surface of the clutch housing 21 and the outer peripheral surface of the inner shaft 22, a pilot clutch 24 which is disposed in the axial direction of the multiple plate clutch 23 and in parallel therewith, an electromagnetic coil 25 and an armature 26 which apply an axial pressing force to the pilot clutch 24, and a cam mechanism 27 by which the torque of the clutch housing 21 transmitted by the pilot clutch 24 is converted into a force pressing the multiple plate clutch 23.

The clutch housing 21 consists of a bottomed cylindrical front housing 211, and an annular rear housing 212 which is linked with the front housing 211 by screwing or the like so that the rear housing 212 can rotate together therewith. A plurality of spline teeth 211a provided along a rotation axis O are formed in the inner peripheral surface of the front housing 211. The rear housing 212 consists of a first member 212a which is made of a magnetic material and which is linked with the front housing 211, a second member 212b which is made of a non-magnetic material and which is linked integrally with the inner peripheral side of the first member 212a, and a third member 212c which is made of a magnetic material and which is linked with the inner peripheral side of the second member 212b.

The inner shaft 22 is supported on the inner peripheral side of the clutch housing 21 by ball bearings 281 and dry bearings 282. A plurality of spline teeth 22a provided along the rotation axis O are formed in the outer peripheral surface of the inner shaft 22. In addition, a plurality of spline teeth 22b for coupling one end portion of the pinion gear shaft 115 (see FIG. 1) so that the end portion of the pinion gear shaft 115 cannot rotate relatively are formed in the inner peripheral surface of the inner shaft 22.

The multiple plate clutch 23 has a plurality of outer clutch plates 231 and a plurality of inner clutch plates 232 which are disposed alternately along the rotation axis O. Each outer clutch plate 231 has a plurality of protrusions 231a which can engage with the spline teeth 211a of the front housing 211 so that the outer clutch plate 231 cannot rotate relatively to the front housing 211 but can move axially. Each inner clutch plate 232 has a plurality of protrusions 232a which can engage with the spline teeth 22a of the inner shaft 22 so that the inner clutch plate 232 cannot rotate relatively to the inner shaft 22 but can move axially.

The pilot clutch 24 has a plurality of pilot outer clutch plates 241 and a plurality of pilot inner clutch plates 242 which are disposed alternately along the rotation axis O. Each pilot outer clutch 241 has a plurality of protrusions 241a which can engage with the spline teeth 211a of the front housing 211 so that the pilot outer clutch plate 241 cannot rotate relatively to the front housing 211 but can move axially. Each pilot outer clutch plate 242 has a plurality of protrusions 242b which can engage with spline teeth 271a formed in the outer peripheral surface of a pilot cam 271 of the cam mechanism 27 which will be described later, so that the pilot inner clutch plate 242 cannot rotate relatively to the pilot cam 271 but can move axially.

The cam mechanism 27 is constituted by the pilot cam 271, a main cam 273 which presses the multiple plate clutch 23 axially, and a plurality of globular cam balls 272 which are disposed between the pilot cam 271 and the main cam 273. Spline teeth 273a are formed in the inner peripheral surface of the main cam 273. The spline teeth 273 engage with the spline teeth 22a of the inner shaft 22 so that the relative rotation of the main cam 273 to the inner shaft 22 can be restricted. A thrust needle-like roller bearing 284 is disposed between the pilot cam 271 and the third member 212c of the rear housing 212.

A plurality of cam grooves 271b and 273b whose axial depths vary are formed circumferentially in the opposed surfaces of the pilot cam 271 and the main cam 273 to each other. When the cam balls 272 roll in the cam grooves, the cam mechanism 27 can generate an axial thrust force pressing the main cam 273 onto the multiple plate clutch 23.

The electromagnetic coil 25 is retained by a yoke 251 supported on the third member 212c by ball bearings 283, and disposed on the opposite side to the pilot clutch 24 of the rear housing 212. An excitation current from the current output circuit 33 (see FIG. 1) of the controller 3 is supplied to the electromagnetic coil 25 through an electric wire 252.

The armature 26 is made of an annular magnetic material, and disposed in a position where the pilot clutch 24 is put between the armature 26 and the rear housing 212, so that the armature 26 can move axially. A plurality of spline teeth 26a engaging with the spline teeth 211a of the front housing 211 are provided in the outer peripheral surface of the armature 26.

In the driving force transmission device 2 configured thus, when an excitation current is supplied to the electromagnetic coil 25 from the current output circuit 33 of the controller 3, magnetic flux is generated in a magnetic path G passing through the yoke 251, the first member 212a and the third member 212c of the rear housing 212, the pilot clutch 24 and the armature 26. The armature 26 is attracted toward the rear housing 212 by the magnetic force of the magnetic flux so as to press the pilot clutch 24.

As a result, the pilot outer clutch plates 241 and the pilot inner clutch plates 242 of the pilot clutch 24 slide on each other frictionally, and the torque of the clutch housing 21 is transmitted to the pilot cam 271 of the cam mechanism 27 through the pilot clutch 24. Thus, the pilot cam 271 rotates relatively to the main cam 273. When the cam balls 272 roll in the cam grooves 271b and 273b due to the relative rotation between the pilot cam 271 and the main cam 273, an axial thrust force to separate the pilot cam 271 and the main cam 273 from each other is generated. The multiple plate clutch 23 is pressed by the main cam 273 due to the thrust force of the cam mechanism 27 so that frictional forces can be generated between the outer clutch plates 231 and the inner clutch plates 232.

The multiple plate clutch 23 is axially pressed, thereby engaging the clutch housing 21 and the inner shaft 22 to each other so that torque can be transmitted. That is, the frictional forces generated between the outer clutch plates 231 and the inner clutch plates 232 serve as the engagement force of the multiple plate clutch 23.

The engagement force of the multiple plate clutch 23 varies in accordance with the excitation current supplied from the current output circuit 33 to the electromagnetic coil 25. That is, when the excitation current is large, the pilot outer clutch plates 241 and the pilot inner clutch plates 242 are pressed to each other strongly by the armature 26. Thus, the torque transmitted to the pilot cam 271 through the pilot clutch 24 increases so that the main cam 273 can press the multiple plate clutch 23 strongly. Accordingly, the engagement force of the multiple plate clutch 23 increases. In this manner, the controller 3 can control the engagement force of the multiple plate clutch 23 continuously (steplessly) by increase/decrease of the excitation current supplied to the electromagnetic coil 25.

Although the driving force transmission device 2 in the embodiment is constituted by the pilot clutch 24, the electromagnetic coil 25, the armature 26 and the cam mechanism 27 so as to press the multiple plate clutch 23, the invention is not limited thereto. For example, rotation of an electric motor may be converted into a linear motion with which the multiple plate clutch 23 can be pressed.

Contents of Processing of Control Unit 32 in Controller 3

Next, description will be made about the contents of processing of the control unit 32. When the control unit 32 serving as the different-diameter tire detector 30 determines that the wheels are unlikely to slip based on the outside condition, the control unit 32 performs detection of a different-diameter tire. Specifically, the different-diameter tire detector 30 determines that the wheels are unlikely to slip when the driving force outputted from the transmission 103 is lower than a threshold set based on the outside condition. The outside condition relates to the occurrence frequency of slipping in the wheels (possibility that a slip occurs). For example, the raining condition based on outside air temperature or the operating state of a wiper or the like, the road surface condition photographed by a vehicle-mounted camera, etc. may be used as the outside condition. In a specific example of the contents of processing of the control unit 32 which will be described below, the threshold is set based on a friction coefficient of a road surface as the outside condition, and the control unit 32 detects the attachment of a different-diameter tire when the driving force outputted from the transmission 103 is lower than the threshold set in accordance with the friction coefficient of the road surface.

A first threshold is set as the threshold of the driving force outputted from the transmission 103 when the friction coefficient of the road surface is equal to or higher than a predetermined value. A second threshold lower than the first threshold is set as the threshold of the driving force when the friction coefficient of the road surface is lower than the predetermined value. When the driving force is lower than the first threshold or the second threshold, the different-diameter tire detector 30 detects the attachment of a different-diameter tire. A specific example of processing to be executed by the control unit 32 serving as the different-diameter tire detector 30 will be described below with reference to FIG. 3.

Figure 3:
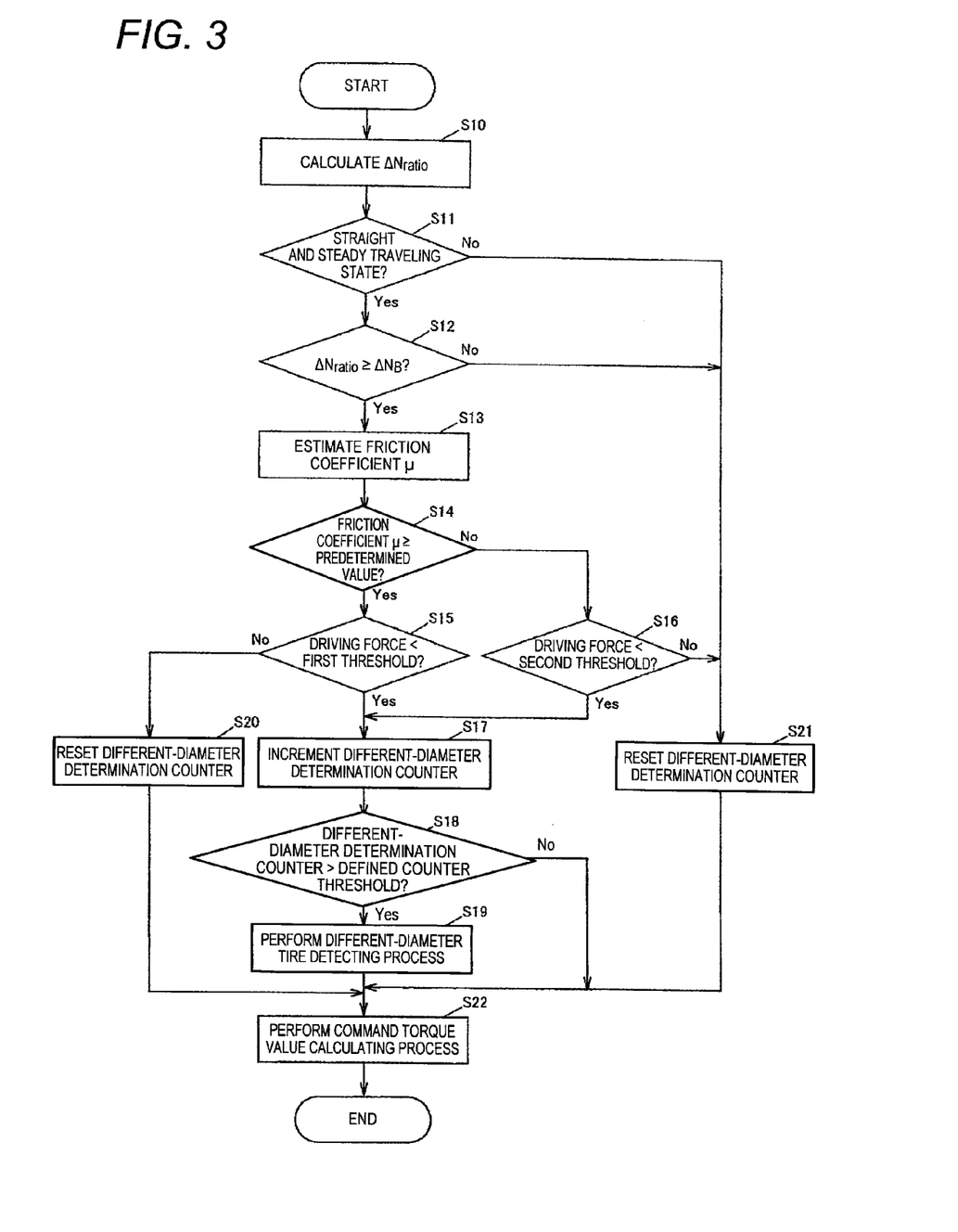
FIG. 3 is a flow chart showing an example of processing to be executed by a control unit of a controller.

FIG. 3 is a flow chart showing the processing to be executed by the control unit 32 of the controller 3. The control unit 32 executes the processing shown in the flow chart repeatedly in a predetermined control period (for example, 100 ms).

The control unit 32 first calculates a rotation speed ratio $\Delta N_{ratio}$ between the front and rear wheels, which ratio is an index value indicating differential rotation between the front wheels 104 and the rear wheels 105 (Step S10). The processing of Step S10 will be described in detail. The control unit 32 calculates wheel speeds W ($W_{fl}$, $W_{fr}$, $W_{rl}$ and $W_{rr}$) of the left front wheel 104L, the right front wheel 104R, the left rear wheel 105L and the right rear wheel 105R based on the detection signals of the wheel speed sensors 302 to 305 respectively, and calculates an average front wheel speed $V_{fa}$ ($V_{fa}=(W_{fl}+W_{fr})/2$) of the left and right front wheels 104L and 104R and an average rear wheel speed $V_{ra}$ ($V_{ra}=(W_{rl}+W_{rr}/2)$ of the left and right rear wheels 105L and 105R. When the average front wheel speed $V_{fa}$ is not lower than the average rear wheel speed $V_{ra}$ ($V_{fa} \geq V_{ra}$), a difference between the two is divided by the average rear wheel speed $V_{ra}$, and a quotient obtained thus is set as a rotation speed ratio $\Delta N_{ratio}$ ($\Delta N_{ratio}=(V_{fa}-V_{ra})/V_{ra}$). On the contrary, when the average front wheel speed $V_{fa}$ is lower than the average rear wheel speed $V_{ra}$ ($V_{fa}<V_{ra}$), a difference between the two is divided by the average front wheel speed $V_{fa}$, and a quotient obtained thus is set as a rotation speed ratio $\Delta N_{ratio}$ ($\Delta N_{ratio}=(V_{ra}-V_{fa})/V_{fa}$).

Next, the control unit 32 determines whether the four-wheel drive vehicle 100 is traveling in the straight and steady traveling state or not (Step S11). The straight and steady traveling state means that the four-wheel drive vehicle 100 is traveling straight at a substantially constant speed. For example, it is possible to determine the straight and steady traveling state when the traveling state is a steady traveling state in which wheel speed change rates indicating the time rates of change in the wheel speeds of the front wheels 104 and the rear wheels 105 are not higher than a predetermined value and the traveling state is a straight traveling state in which the steering angle detected by the steering angle sensor 300 indicates a substantially straight traveling state (for example, the turning radius is not shorter than 100 m). Alternatively, whether the four-wheel drive vehicle 100 is traveling in the straight and steady traveling state or not may be determined based on detection values of the longitudinal acceleration sensor 306, the lateral acceleration sensor 307 and the yaw rate sensor 308.

When the four-wheel drive vehicle 100 is not traveling in the straight and steady traveling state (No in S11), the control unit 32 resets a different-diameter determination counter which will be described later (Step S21).

On the contrary, when the four-wheel drive vehicle 100 is traveling in the straight and steady traveling state (Yes in S11), the control unit 32 determines whether the rotation speed ratio $\Delta N_{ratio}$ calculated in Step S10 reaches at least a reference rotation speed ratio $\Delta N_b$ or not (Step S12). The reference rotation speed ratio $\Delta N_b$ is set to be as high as or lower than the rotation speed ratio $\Delta N_{ratio}$ which will be obtained when a spare tire is attached to one of the left front wheel 104L, the right front wheel 104R, the left rear wheel 105L and the right rear wheel 105R. The reference rotation speed ratio $\Delta N_b$ set thus is stored in the storage unit 31 in advance. The specific numeric value of the reference rotation speed ratio $\Delta N_b$ is, for example, 0.01 to 0.03 (1% to 3%).

When the rotation speed ratio $\Delta N_{ratio}$ is lower than the reference rotation speed ratio $\Delta N_b$ (No in S12), the control unit 32 resets the different-diameter determination counter which will be described later (Step S21).

On the contrary, when the rotation speed ratio $\Delta N_{ratio}$ reaches at least the reference rotation speed ratio $\Delta N_b$ (Yes in S12), the control unit 32 estimates a friction coefficient μ (road surface friction coefficient) of a road surface on which the four-wheel drive vehicle 100 is traveling, based on the outside condition (Step S13).

Next the control unit 32 determines whether the friction coefficient μ calculated in Step S13 reaches at least a predetermined value or not (Step S14). This predetermined value is determined based on experiments and so on in advance as a reference value for determining whether the traveling road surface is, for example, a high μ road surface such as a dried paved road surface or a low μ road surface such as a wet road surface or an iced road surface, and the determined predetermined value is stored in the storage unit 31. A specific numeric value of the predetermined value in Step S14 is, for example, 0.7 to 0.9.

When the friction coefficient μ of the road surface reaches at least the predetermined value in Step S14 (Yes in S14), the control unit 32 determines whether the driving force outputted from the transmission 103 is smaller than the first threshold or not (Step S15). The driving force can be calculated, for example, based on the output torque of the engine 102 and the gear ratio of the transmission 103. Alternatively the torque of the output shaft of the transmission 103 detected by a torque sensor may be used as the driving force.

The first threshold is, for example, a value corresponding to the driving force with which the rotation speed ratio $\Delta N_{ratio}$ does not reach the reference rotation speed ratio $\Delta N_b$ when the four-wheel drive vehicle 100 in which a different-diameter tire is not attached to any wheel is traveling on a high μ road. That is, the first threshold is such a value that, if the rotation speed ratio $\Delta N_{ratio}$ reaches at least the reference rotation speed ratio $\Delta N_b$ when the four-wheel drive vehicle 100 is traveling on a high μ road with a driving force smaller than the driving force corresponding to the first threshold, it is suggested that a different-diameter tire has been attached. That is, when the driving force is smaller than the first threshold in the determination of Step S15, it is determined that the possibility that a slip occurs due to an excessive driving force is low but the possibility that a different-diameter tire has been attached is high.

On the contrary, when the friction coefficient μ of the road surface is smaller than the predetermined value in Step S14 (No in S14), the control unit 32 determines whether the driving force outputted from the transmission 103 is smaller than the second threshold or not (Step S16). The second threshold is a value smaller than the first threshold and, for example, corresponding to a driving force with which the rotation speed ratio $\Delta N_{ratio}$ does not reach the reference rotation speed ratio $\Delta N_b$ when the four-wheel drive vehicle 100 is traveling on a low μ road. That is, the second threshold is such a value that, if the rotation speed ratio $\Delta N_{ratio}$ reaches at least the reference rotation speed ratio $\Delta N_b$ when the four-wheel drive vehicle 100 is traveling on a low μ road with a driving force smaller than the driving force corresponding to the second threshold, it is suggested that a different-diameter tire has been attached. That is, when the driving force is smaller than the second threshold in the determination of Step S16, it is determined that the possibility that a slip occurs due to an excessive driving force with respect to the friction coefficient μ of the road surface is low but the possibility that a different-diameter tire has been attached is high.

In this manner, in the processing of Steps S14 to S16, the control unit 32 sets thresholds (the first threshold and the second threshold in the embodiment) serving as determination criteria for determining the magnitude of the driving force in Steps S15 and S16 in accordance with the friction coefficient μ of the road surface on which the four-wheel drive vehicle 100 is traveling.

When the driving force is smaller than the first threshold in the determination of Step S15 (Yes in S15) or when the driving force is smaller than the second threshold in the determination of Step S16 (Yes in S16), the control unit 32 increments the different-diameter counter (Step S17). Here, to increment is to add 1 to a count value. That means that time corresponding to a control period has passed whenever the count value of the different-diameter determination counter is incremented. That is, the count value of the different-diameter determination counter indicates the duration for which the result of determination in Step S15 or S16 is Yes.

On the other hand, when the driving force is not smaller than the first threshold in the determination of Step S15 (No in S15), the control unit 32 resets the different-diameter determination counter (Step S20). In the same manner, the control unit 32 also resets the different-diameter determination counter (Step S21) when the driving force is not smaller than the second threshold in the determination of Step S16 (No in S16).

Next the control unit 32 determines whether the value of the different-diameter determination counter is larger than a defined counter threshold or not (Step S18). The defined counter threshold is a threshold corresponding to detection time for definitely determining the attachment of a different-diameter tire when the state where the result of determination in Step S15 or Step S16 is Yes is continued. The defined counter threshold is set so that a product of the control period (second) and the defined counter threshold can coincide with, for example, 10 seconds.

When the value of the different-diameter determination counter is larger than the defined counter threshold (Yes in S18), the control unit 32 determines that a different-diameter tire has been attached, and carries out processing corresponding thereto (different-diameter tire detection processing). The different-diameter tire detection processing is, for example, a processing in which a flag indicating the attachment of a different-diameter tire is set ON. Alternatively the different-diameter tire detection processing is a processing for informing the driver of the fact that a different-diameter tire has been attached and urging the driver to replace the tire as early as possible.

In the embodiment, the different-diameter tire detection flag indicating the attachment of a different-diameter tire is set ON in the different-diameter tire detection processing of Step S19, and the status of the different-diameter tire detection flag is referred to in command torque calculation processing of Step S22 to be executed after the processing of Step S19 or when the result of determination in Step S18, S20 or S21 is No.

In the command torque calculation processing of Step S22, the control unit 32 calculates a value of command torque to be transmitted to the rear wheels 105. The control unit 32 makes command torque in the case where the different-diameter detection flag is ON (in the case where it is determined that a different-diameter tire has been attached) lower than command torque in the case where the different-diameter detection flag is OFF (in the case where it is not determined that a different-diameter tire has been attached).

Specifically, in the case where the different-diameter detection flag is ON, the driving force is distributed to the rear wheels 105 only when the vehicle starts in the stopping state where the vehicle speed is zero. The command torque is made zero after the vehicle speed reaches at least a predetermined value (for example, 10 km/h). Alternatively, pre-torque T1 corresponding to a quantity of accelerator operation performed by the driver, and ΔN torque T2 corresponding to the differential rotation frequency between the front wheels 104 and the rear wheels 105 may be calculated so that a summation of the pre-torque T1 and the ΔN torque T2 can be set as the command torque when the different-diameter detection flag is OFF, and only the pre-torque T1 can be set as the command torque when the different-diameter detection flag is ON.

The current output circuit 33 of the controller 3 supplies, to the electromagnetic coil 25 of the driving force transmission device 2, an excitation current corresponding to the command torque calculated thus. As a result, the multiple plate clutch 23 of the driving force transmission device 2 is engaged so that a driving force corresponding to the command torque can be distributed to the rear wheels 105.

Effects and Advantages of Embodiment

According to the embodiment described above, when the driving force outputted from the transmission 103 is lower than a threshold set based on the outside condition, it is determined that the wheels are unlikely to slip but it is detected that a different-diameter tire has been attached. It is therefore possible to suppress influence on the rotation speeds of the front and rear wheels caused by slipping in the wheels and it is possible to secure the accuracy in detecting a different-diameter tire. In addition, in the specific example described with reference to FIG. 3, the attachment of a different-diameter tire is detected when the driving force is lower than a threshold (the first threshold or the second threshold) set based on the friction coefficient μ of the road surface. It is therefore possible to surely suppress influence of a slip (slipping between the grounded surface of a tire and the road surface) caused by an excessive driving force with respect to the friction coefficient μ of the road surface, and it is possible to enhance the accuracy in detecting a different-diameter tire.

In addition, according to the embodiment, in the case where the friction coefficient μ of the road surface as the outside condition is lower than a predetermined value, the attachment of a different-diameter tire is detected when the driving force is lower than the second threshold which is lower than the first threshold. It is therefore possible to enhance the accuracy in detecting a different-diameter tire, for example, even during traveling on a low μ road.

Although a driving force distribution control apparatus according to the embodiments of the invention and a four-wheel drive vehicle have been described based on the above-described embodiment, the invention is not limited to the embodiment, but various changes or modifications may be made without departing from spirit and scope of the invention.

For example, although the above-described embodiment has been described in the case where a threshold value of the driving force is set in two steps, that is, as the first threshold and the second threshold in accordance with the friction coefficient μ of the road surface, the threshold may be set in three or more steps or steplessly.

Although the above-described embodiment has been described in the case where the front wheels 104 are set as main driving wheels and the rear wheels 105 are set as auxiliary driving wheels, the invention is not limited to the embodiment. The invention may be applicable to a four-wheel drive vehicle in which the front wheels 104 are set as auxiliary driving wheels and the rear wheels 105 are set as main driving wheels.

Further, the configuration of the driving force transmission system 101 is not limited to the configuration shown in FIG. 1 by way of example, but various configurations may be used. For example, the driving force transmission device 2 may be disposed between the rear differential device 116 and the drive shaft 116L or the drive shaft 116R. Alternatively, the driving force transmission device 2 may be constituted by a center differential device and a clutch which limits a differential motion of the center differential device.

In addition, although the threshold of the driving force is set in accordance with the friction coefficient μ of the road surface in the above-described embodiment, the invention is not limited thereto. For example, thresholds of the driving force for determining a different-diameter tire (thresholds corresponding to the first and second thresholds in Steps S15 and S16 in the flow chart of FIG. 3) may be set to be lower as the outside air temperature is lower. Alternatively, the thresholds of the driving force for determining a different-diameter tire may be set to be lower in accordance with the operating frequency of a wiper operating in raining condition in place of the outside air temperature, as the operating frequency is higher. Alternatively, when the outside air temperature is lower than a predetermined temperature (for example, 0° C.) or when it is raining (the wiper is operating), it may be determined that one of the front wheels 104 and the rear wheels is likely to slip regardless of the magnitude of the driving force, and the determination of a different-diameter tire may be prevented from being performed.

The invention claimed is:

1. A driving force distribution control apparatus comprising:
   a driving force transmission device comprising a clutch which can change distribution of a driving force to front wheels and rear wheels of a four-wheel drive vehicle; and
   a controller which controls an engagement force of the clutch in accordance with a traveling state,
   wherein the controller comprises a different-diameter tire detector which detects an attachment of a different-diameter tire to one of the front wheels and the rear wheels when a rotation speed ratio between the front wheels and the rear wheels continues to be equal to or larger than a reference rotation speed ratio for a predetermined time, and
   wherein the different-diameter tire detector determines whether the wheels are likely to slip based on an outside condition, and performs detection of the attachment of the different-diameter tire based on a driving force threshold determined by the determination of whether the wheels are unlikely to slip.

2. The driving force distribution control apparatus according to claim 1,
   wherein the different-diameter tire detector determines that the wheels are unlikely to slip when the driving force is lower than a threshold which is set based on the outside condition.

3. The driving force distribution control apparatus according to claim 2,
   wherein the threshold is set based on a friction coefficient of a road surface as the outside condition.

4. A driving force distribution control apparatus comprising:
   a driving force transmission device comprising a clutch which can change distribution of a driving force to front wheels and rear wheels of a four-wheel drive vehicle; and
   a controller which controls an engagement force of the clutch in accordance with a traveling state,
   wherein the controller comprises a different-diameter tire detector which detects an attachment of a different-diameter tire to one of the front wheels and the rear wheels when a rotation speed ratio between the front wheels and the rear wheels continues to be equal to or larger than a reference rotation speed ratio for a predetermined time,
   wherein the different-diameter tire detector determines whether the wheels are likely to slip based on a friction coefficient of a road surface, and performs detection of the attachment of the different-diameter tire based on the determination of whether the wheels are unlikely to slip and the driving force,
   wherein the different-diameter tire detector determines that the wheels are unlikely to slip when the driving force is less than a first threshold at a time when it is determined that the friction coefficient of the road surface is equal to or greater than a predetermined value, and
   wherein the different-diameter tire detector determines that the wheels are unlikely to slip when the driving force is less than a second threshold at a time when it is determined that the friction coefficient of the road surface is less than a predetermined value, wherein the second threshold value is lower than the first threshold value.

* * * * *